US008806228B2

(12) United States Patent
Gee et al.

(10) Patent No.: US 8,806,228 B2
(45) Date of Patent: Aug. 12, 2014

(54) SYSTEMS AND METHODS FOR ASYMMETRICAL PERFORMANCE MULTI-PROCESSORS

(75) Inventors: Timothy W. Gee, Cary, NC (US); Mark A. Rinaldi, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 2549 days.

(21) Appl. No.: 11/457,414

(22) Filed: Jul. 13, 2006

(65) Prior Publication Data

US 2008/0016374 A1 Jan. 17, 2008

(51) Int. Cl.
*G06F 1/00* (2006.01)

(52) U.S. Cl.
USPC ............................................. 713/300

(58) Field of Classification Search
USPC ............................................. 713/300
See application file for complete search history.

(56) References Cited

U.S. PATENT DOCUMENTS

| | | | |
|---|---|---|---|
| 3,768,074 A * | 10/1973 | Sharp et al. ................. 710/100 |
| 5,898,557 A * | 4/1999 | Baba et al. ................... 361/103 |
| 6,240,521 B1 | 5/2001 | Barber et al. |
| 6,631,474 B1 * | 10/2003 | Cai et al. ...................... 713/300 |
| 6,877,087 B1 * | 4/2005 | Yamada et al. ............... 712/226 |
| 7,007,004 B2 * | 2/2006 | Liukkonen et al. ............... 707/1 |
| 7,058,829 B2 * | 6/2006 | Hamilton ..................... 713/320 |
| 7,099,864 B2 * | 8/2006 | Finlay et al. ..................... 707/7 |
| 7,184,003 B2 * | 2/2007 | Cupps et al. .................... 345/30 |
| 7,349,762 B2 * | 3/2008 | Omizo et al. .................. 700/278 |
| 2002/0016892 A1 | 2/2002 | Zalewski et al. |
| 2002/0052914 A1 | 5/2002 | Zalewski et al. |
| 2003/0163666 A1 | 8/2003 | Cupps et al. |
| 2004/0093512 A1 * | 5/2004 | Sample ......................... 713/201 |
| 2006/0259743 A1 * | 11/2006 | Suzuoki ........................ 712/220 |
| 2007/0157201 A1 * | 7/2007 | Schmidt et al. ................. 718/100 |

FOREIGN PATENT DOCUMENTS

| | | |
|---|---|---|
| CN | 1415085 A | 4/2003 |
| CN | 1666180 A | 9/2005 |
| WO | WO 2005/124550 A1 | 12/2005 |

* cited by examiner

*Primary Examiner* — Mohammed Rehman
(74) *Attorney, Agent, or Firm* — Steven J. Meyers; Schubert Law Group PLLC (57) ABSTRACT

Systems, methods and media for allocating processing functions between a primary processor and a secondary processor are disclosed. In one embodiment, a primary processor performs routine processing duties, including execution of application program code, while the secondary processor is in a sleep state. When the load on the primary processor is deemed to be excessive, the secondary processor is awakened from a sleep state and assigned to perform processing functions that would otherwise need to be performed by the primary processor. If temperatures in the system rise above a threshold, the secondary processor is returned to the sleep state.

19 Claims, 5 Drawing Sheets

SYSTEMS AND METHODS FOR ASYMMETRICAL PERFORMANCE MULTI-PROCESSORS

FIELD

The present invention is in the field of computers. More particularly, the invention relates to allocation of processing tasks between multiple processors in a computing system.

BACKGROUND

Many different types of computing systems have attained widespread use around the world. These computing systems include personal computers, servers, mainframes and a wide variety of stand-alone and embedded computing devices. Sprawling client-server systems exist, with applications and information spread across many PC networks, mainframes and minicomputers. In a distributed system connected by networks, a user may access many application programs, databases, network systems, operating systems and mainframe applications. Computers provide individuals and businesses with a host of software applications including word processing, spreadsheet, and accounting. Further, networks enable high speed communication between people in diverse locations by way of e-mail, websites, instant messaging, and web-conferencing.

A common architecture for high performance, single-chip microprocessors is the reduced instruction set computer (RISC) architecture characterized by a small simplified set of frequently used instructions for rapid execution. Thus, in a RISC architecture, a complex instruction comprises a small set of simple instructions that are executed in steps very rapidly. These steps are performed in execution units adapted to execute specific simple instructions. In a superscalar architecture, these execution units typically comprise load/store units, integer Arithmetic/Logic Units, floating point Arithmetic/Logic Units, and Graphical Logic Units that operate in parallel. In a processor architecture, an operating system controls operation of the processor and components peripheral to the processor. Executable application programs are stored in a computer's hard drive. The computer's processor causes application programs to run in response to user inputs.

In some systems a service processor operates in conjunction with a main processor. The main processor performs most of the processing work including the execution of application program code, whereas the service processor performs routine tasks. These routine tasks include configuring the system components, including configuring the main processor. A present day processing system consists of a collection of entities. These include memory, devices (ethernet adapters, USB adapters, video adapter), and processors, all of which have to work together to accomplish the functions of the computer. These entities may be grouped together based on physical characteristics, for example, how many address/data lines they have, how those lines are driven, what clock speeds they need, etc. These devices are in communication through address and data busses. Entities of one bus must communicate to entities of another bus. The device that conducts information from one bus to another is called a bridge.

An important job of the service processor is to go through the web of buses and configure these bridges so that the individual buses can work together as an effective system. The service processor provides setup information to the main processor, and configures clocks and system voltage sources. The service processor also starts the main processor. After the processor is started, the main processor finishes system initialization by configuring all the specific devices on the busses, starts the operating system and begins executing application programs.

Once the main processor is running, the service processor is relieved of initialization duties and then starts monitoring the system environment. For example, the service processor monitors thermal conditions and if the system gets to hot, the service processor may start a fan. If the system temperature continues to rise, the service processor may slow the main processor so that it consumes less power and dissipates less heat. In a temperature extreme, the service processor may shut the main processor down.

The service processor does not execute application program code and also has its own code space; i.e., the code executed by the service processor is different and separate in memory from the code executed by the main processor. Since the service processor in current systems does not execute the operating system code executed by the main processor, and also does not execute application program code, the service processor power is not fully utilized. Accordingly, there is a need for more efficient allocation of processing functions between a primary processor and a secondary processor to achieve more efficient power consumption.

SUMMARY

The problems identified above are in large part addressed by systems, methods and media for allocation of processing duties between a primary processor and a secondary processor. In one embodiment, the system comprises a primary processor to perform processor functions, including application code execution, as long as the occurrence of a special condition is not detected. The system further comprises a secondary processor to perform at least some processor functions when the occurrence of the special condition is detected. The secondary processor is held in a sleep state if the special condition has not occurred. The secondary processor is placed in a wake state and is allocated processing functions if a special condition has occurred. In the event that a temperature exceeds a threshold, the secondary processor is returned to the sleep state. A common operating system may be executed by both the primary processor and the secondary processor when the secondary processor is not in a sleep state.

Embodiments include a method for allocating processing functions among a primary processor and a secondary processor. The method comprises storing executable code in a memory accessible by both the primary processor and the secondary processor. A primary processor executes computer code including application code when a special condition has not occurred. A secondary processor executes executable code when the special condition has occurred. The secondary processor is held in a sleep state when the special condition has not occurred. The special condition may comprise a level of processor usage exceeding a threshold, or may comprise receipt of a floating point instruction by the primary processor or receipt of instructions for performing spreadsheet calculations and updates, print and preview functions that format and render graphics, application program startups, anti-virus file scans, and viewing web casts. The secondary processor is awakened when the special condition has occurred. The secondary processor may be returned to a sleep state if thermal conditions exceed a specified threshold.

Another embodiment of the invention provides a computer program product comprising instructions effective, when executing in a data processing system, to cause the system to perform a series of operations for allocating processing functions between a primary processor and a secondary processor.

The series of operations generally include monitoring one or more special conditions. The secondary processor is maintained in a sleep state if one or more special conditions do not occur. Processing functions are allocated to be performed by the secondary processor if one or more special conditions do occur. Once, again the secondary processor may be returned to a sleep state if thermal conditions exceed a specified threshold.

BRIEF DESCRIPTION OF THE DRAWINGS

Advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Systems, methods and media for allocating processing functions between a primary processor and a secondary processor are disclosed. In one embodiment, a primary processor performs routine processing duties, including execution of application program code, while the secondary processor is in a sleep state. When the load on the primary processor is deemed to be excessive, the secondary processor is awakened from a sleep state and assigned to perform processing functions that would otherwise need to be performed by the primary processor. If temperatures in the system rise above a threshold, the secondary processor is returned to the sleep state.

Figure 1:
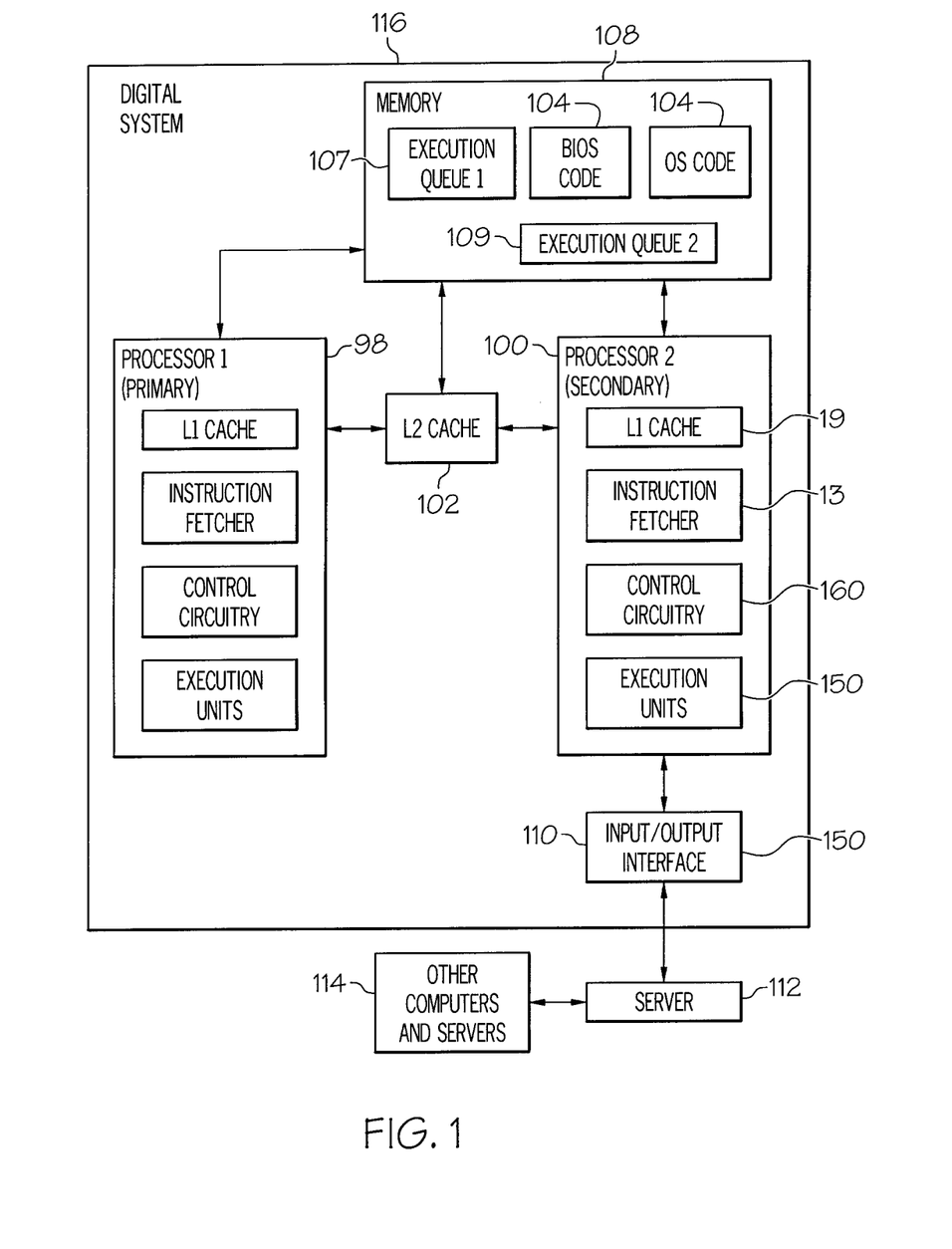
FIG. 1 depicts an embodiment of a digital system within a network; within the digital system is a primary processor and a secondary processor.

FIG. 1 shows a digital system 116 such as a computer implemented according to one embodiment of the present invention. Digital system 116 comprises a first processor (processor 1) 98 and a second processor (processor 2) 100. Processor 98 is the primary processor and processor 100 is the secondary processor. Each of processors 98, 100 operate according to BIOS (Basis Input/Output System) Code 104 and Operating System (OS) Code 106. The BIOS and OS code is stored in memory 108. The BIOS code is typically stored on Read-Only Memory (ROM) and the OS code is typically stored on the hard drive of computer system 116. Digital system 116 comprises a level 2 (L2) cache 102 located physically close to processors 98, 100. Memory 108 also stores other programs for execution by processors 98, 100. In an embodiment, memory 108 stores allocation software useful to allocate processing burden between processors 1 and 2, as will be described herein. This software may be part of the OS code 106. Memory 108 may further comprise a first execution queue 107 containing instructions pending to be executed by processor 1, and a second execution queue 109 containing instructions pending to be executed by processor 2. Memory 108 also stores data to be used by processors 98, 100 in the course of executing instructions.

In one embodiment, primary processor 98 is a low-power processor that operates more slowly and uses less power than secondary processor 100. Secondary processor 100 is a high power processor that operates relatively fast compared to primary processor 98 and uses more power. Moreover, secondary processor 100 may execute floating point instructions directly by execution unit hardware, whereas primary processor 98 may execute floating point instructions more slowly by way of software emulation of floating point hardware. In routine operation, low-power processor 98 executes routine functions such as keyboard and mouse communications, relatively simple video display functions and other routine collateral functions. In addition, primary processor 98 can routinely execute all software and perform all operations normally executed and performed by a computer system.

When the load on primary processor 98 is deemed to be too heavy, then some of the work is offloaded onto relatively high power, high speed processor 100. Accordingly, secondary processor 100 is normally in a sleep state and is awakened only when the burden on primary processor 98 is deemed to be too large. While in a sleep state, secondary processor 100 only operates to maintain its L1 cache memory, and perform other minimal functions, and does not execute operating system or application program code. More specifically, when secondary processor 100 is in a sleep state, all configuration parameters, i.e. power management options, clocking options, core error handling options, memory cache options, high performance tuned bus options, are all setup and preserved in memory. This is in contrast to the processor being completely powered down. If the processor were powered off, then primary processor 98 would have to execute initialization procedures to restore this information before secondary processor 100 would be operational.

In a sleep state, only a hardware interrupt command needs be applied to have the processor access a predetermined memory location, restore a set of general purpose registers, and start executing code. Alternative embodiments may employ alternative methods for waking the secondary processor. When the secondary processor 100 is operating, the operating system assigns to it the most labor intensive processes, while assigning to the primary processor 98 minor tasks such as processing inputs from the keyboard or mouse and painting the video display. Labor intensive processes allocated to secondary processor 100 may include floating point operations, database operations, spreadsheet calculations and updates, print and preview functions that format and render graphics, application program startups, anti-virus file scans, and viewing web casts.

A processor 98, 100 comprises an on-chip level one (L1) cache 190, an instruction fetcher 130, control circuitry 160, and execution units 150. Level 1 cache 190 receives and stores instructions that are near to time of execution. Instruction fetcher 130 fetches instructions from memory. Execution units 150 perform the operations called for by the instructions. Execution units 150 may comprise load/store units, integer Arithmetic/Logic Units, floating point Arithmetic/Logic Units, and Graphical Logic Units. Each execution unit comprises stages to perform steps in the execution of the instructions fetched by instruction fetcher 130. Control circuitry 160 controls instruction fetcher 130 and execution units 150. Control circuitry 160 also receives information relevant to control decisions from execution units 150. For example, control circuitry 160 is notified in the event of a data cache miss in the execution pipeline to process a stall.

Digital system 116 also typically includes other components and subsystems not shown, such as: a Trusted Platform Module, memory controllers, random access memory (RAM), peripheral drivers, a system monitor, a keyboard, a color video monitor, one or more flexible diskette drives, one or more removable non-volatile media drives such as a fixed disk hard drive, CD and DVD drives, a pointing device such as a mouse, and a network interface adapter, etc. Digital systems 116 may include personal computers, workstations, servers, mainframe computers, notebook or laptop computers, desktop computers, or the like. One or both of processors 98, 100 may also communicate with a server 112 by way of Input/Output Device 110. Server 112 connects system 116 with other computers and servers 114. Thus, digital system 116 may be in a network of computers such as the Internet and/or a local intranet. Further, server 112 may control access to other memory comprising tape drive storage, hard disk arrays, RAM, ROM, etc.

Thus, in one mode of operation of digital system 116, the L2 cache receives from memory 108 data and instructions expected to be processed in the processor pipeline of a processor 98, 100. L2 cache 102 is fast memory located physically close to processors 98, 100 to achieve greater speed. The L2 cache receives from memory 108 the instructions for a plurality of instruction threads. Such instructions may include load and store instructions, branch instructions, arithmetic logic instructions, floating point instructions, etc. The L1 cache 190 is located in the processor core and contains data and instructions preferably received from L2 cache 102. Ideally, as the time approaches for a program instruction to be executed, the instruction is passed with its data, if any, first to the L2 cache, and then as execution time is near imminent, to the L1 cache.

Execution units 150 execute the instructions received from the L1 cache 190. Execution units 150 may comprise load/store units, integer Arithmetic/Logic Units, floating point Arithmetic/Logic Units, and Graphical Logic Units. Each of the units may be adapted to execute a specific set of instructions. Instructions can be submitted to different execution units for execution in parallel. In one embodiment, two execution units may be employed simultaneously by a processor 98, 100 to execute certain instructions. Data processed by execution units 150 are storable in and accessible from integer register files and floating point register files (not shown.) Data stored in these register files can also come from or be transferred to on-board L1 cache 190 or an external cache or memory. The processor can load data from memory, such as L1 cache, to a register of the processor by executing a load instruction. The processor can store data into memory from a register by executing a store instruction.

The memory of a computer comprises Read-Only-Memory (ROM), cache memory implemented in DRAM and SRAM, a hard disk drive, CD drives and DVD drives. A server also has its own memory and may control access to other memory such as tape drives and hard disk arrays. Each computer in a network may store and execute its own application programs. Some application programs, such as databases, may reside in the server. Thus, each computer may access the same database stored in the server. In addition, each computer may access other memory by way of the server.

Thus, embodiments encompass a multi-processor system with a primary, low-power processor 98 and a secondary, high power processor 100. In another embodiment, both processors may achieve comparable power consumption. Upon start-up, primary processor 98 initializes system resources, and brings up to the ready, secondary processor 100 and performs configuration duties. These configuration duties are similar to configuration duties normally performed by a simple service processor. Upon completion of initialization and configuration, secondary processor 100 drops into a sleep state. While in a sleep state, secondary processor 100 does not execute computer code. In the sleep state, secondary processor 100 performs no processing duties and merely remains ready to perform operations when called upon to do so by primary processor 98 operating under the directions of the OS. Meanwhile, primary processor 98 performs all processing functions including execution of application program code.

In normal operation the OS code comprises a system idle task routine performed by primary (low-power) processor 98 to enable determination of processor usage. In a multi-tasking operating system, such as OS-X, Windows, Linux, AIX, each of the tasks that vie for access to the processor must register its intent by placing itself in an execution queue. Each task will run for a small amount of time, and then pause so that other tasks can run. Sometimes a task might also pause because information is needed that is not readily available, such as an input from the keyboard. When a task pauses, or is completed, the system returns to executing the operating system code, while the task remains in an execution queue. The operating system then directs processor 98 to execute the next task in the execution queue. If there are no tasks in the execution queue, processor 98 performs the system idle task until a task is again entered into the execution queue. In one embodiment, system usage is the ratio of time spent in the system idle task during a given period to time spent performing processor functions and the system idle task. If, for example, during a 1 second period, 500 millisec is spent in the system idle task, utilization is 50%. Other embodiments may use alternative measurements of system usage, as will be recognized by persons of ordinary skill in the art.

Monitoring the time of the system idle task thus enables determination of a level of primary processor usage. If usage exceeds a certain specifiable first threshold, then primary processor 98 calls secondary processor 100 into operation. Logic to perform this comparison function may be included in OS code or as in separate code executable by primary processor 98. This threshold is stored in ROM or may be input by a user and stored in read-writable memory. More specifically, primary processor 98 would generate a hardware interrupt command under direction of the operating system to secondary processor 100, which calls secondary processor 100 into operation. Then, secondary processor 100 begins executing code in its execution queue, labeled as execution queue 2, 109, in FIG. 1. Meanwhile, primary processor 98 may still perform some processing duties by executing code in its execution queue, labeled as execution queue 1, 107, in FIG. 1.

Thus, each processor 98 and 100 has its own execution queue. When a special condition occurs, signifying the need to awaken secondary processor 100, primary processor 98 can move tasks from its execution queue 107 to the secondary processor's execution queue 109. In some embodiments, an attribute of a task's task control block indicates the originating execution queue so that the task is associated with the originating execution queue. Certain tasks, as for example, floating point operations, may only be executable by secondary processor 100. Such tasks may be so designated by another attribute of the task's task control block.

If secondary processor 100 is put to sleep because of, for example, thermal conditions exceeding a threshold, execution of secondary-processor-only tasks are suspended until the secondary processor is again awakened. All other tasks may be returned to the primary processor execution queue 107 for execution by the primary processor. If, while secondary processor 100 is asleep, and the primary processor's level of utilization rises above a threshold, then the primary processor's execution queue 107 is scanned for processes owned by secondary processor 100, as indicated by each task's task control block. These are moved to the secondary processor's execution queue 109 and secondary processor 100 is awakened.

If there are no tasks owned by secondary processor 100 in the queue 107 of primary processor 98 when it is time to wake up secondary processor 100, then some of the tasks in primary processor queue 107—perhaps, half of them—are transferred to secondary processor queue 109. These tasks are still owned by primary processor 98, but any processes to be executed resulting from the execution of these task may be owned by secondary processor 100. When secondary processor 100 finishes execution of all tasks in its queue 109, then secondary processor 100 may be put to sleep.

Thus, in one embodiment, processor 100, when called into operation by processor 98, will perform the system idle task and will return to a sleep state when CPU usage of secondary processor 100 drops below a certain specifiable second threshold. Secondary processor 100 is returned to the sleep state by a hardware interrupt command generated by primary processor 98 under directions of the OS code 106. For example, primary processor 98 may enqueue a sleep task into the execution queue of the secondary processor causing the secondary processor to write a bit to its machine state register, to induce a sleep state. Alternative embodiments may be employed for placing the secondary processor in a sleep state. Further, in some embodiments, the first threshold may be different from the second threshold to form a hysteresis of operation of secondary processor 100. These thresholds may be stored in ROM (read-only-memory) and accessed when needed. In another embodiment, these thresholds are stored in read-writable memory and may be specified by a user through a user interface device such as a keyboard.

In one embodiment, primary processor 98 will call secondary processor 100 into operation when a particular condition occurs. For example, in one embodiment primary processor 98 may lack floating point execution units for performing floating point arithmetic. In this case, upon receiving an operation code calling for floating point arithmetic to be performed, primary processor 98 will call secondary processor 100—which does contain floating point execution units—into operation to perform the floating point arithmetic.

Thus, when primary processor 98 reaches a threshold level of utilization or other special condition occurs, primary processor 98 calls into operation secondary processor 100. To do this, primary processor 98 stores its state for a thread of execution to be offloaded to secondary processor 100. The state is stored in memory accessible to both the primary and secondary processor. Primary processor 98 brings secondary processor 100 up to a state enabling inter-processor communications and informs secondary processor 100 of a current time base value and transmits the address of the start of the thread to be executed by secondary processor 100. Other procedures for bringing secondary processor 100 into operation will be recognized by persons of ordinary skill in the art. Primary processor 98 informs the OS dispatcher that secondary processor 100 is awake and ready to assist in processing of instructions to be executed. The OS dispatcher is that portion of OS code 106 that receives a task from a queue and directs the task to be executed by a processor. Thus, the OS dispatcher will obtain each next task to be run from the execution queue 109 of secondary processor 100 and cause each task to be executed by secondary processor 100.

When awakened, secondary processor 100 loads the context information (e.g., the address of the instruction from which execution is to commence) and branches to that location. Thus, secondary processor 100 acts as though returning from an interrupt. Secondary processor 100 is now controlled by the OS code 106. A thread assigned to secondary processor 100 is performed exclusively by secondary processor 100, and not by primary processor 98. Once called into operation, secondary processor 100 also executes whatever additional threads assigned to it by OS code 106. In one embodiment, during multi-processor operations, primary processor 98 will be informed by timing of a system idle task to monitor secondary processor usage levels, whether secondary processor utilization drops below a threshold. In another embodiment, primary processor monitors whether primary processor usage drops below a threshold. Thus, when processing demand is again light, secondary processor 100 is caused by primary processor 98 to drop back into a sleep mode and primary processor 98 assumes full responsibility for operations until a need for secondary processor 100 again occurs.

In some embodiments, transfer of processing duties from secondary processor 100 to primary processor 98 may occur in the event that thermal conditions exceed a specified threshold. This monitoring of thermal conditions and comparison to a temperature threshold may be performed by processor 98 operating under the directions of OS code 106. This is especially important in the case of laptop computers where thermal conditions may become critical and cooling is not easily achieved. Thus, in the course of operation by secondary processor 100, component temperatures may rise. Component temperatures may be detected by temperature sensors strategically located within the housing of digital system 116, and in particular, a temperature sensor may be located to detect temperature in proximity to secondary processor 100. In the event that a temperature exceeds a threshold, secondary processor 100 is brought to a sleep state, and primary processor 98, which may dissipate less power in the form of heat, takes over all system operations. Therefore, transfer of processing responsibilities to secondary processor 100 may be conditioned upon processor usage, and transfer of processing responsibilities back to primary processor 98 may be conditioned upon thermal conditions.

Figure 2:
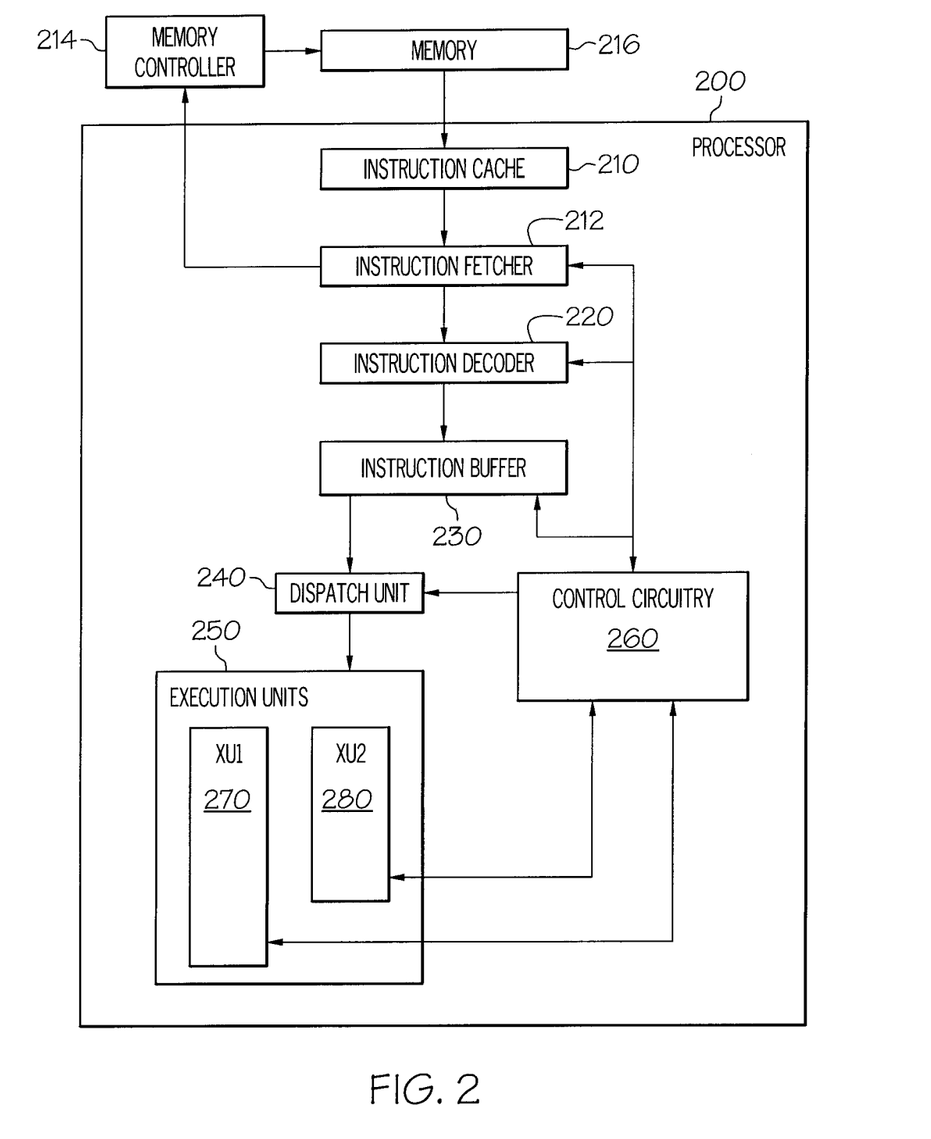
FIG. 2 depicts an embodiment of a processor within a computer that may be configured to allocate processing functions between the primary and secondary processors.

FIG. 2 shows an embodiment of a primary or secondary processor 200 that can be implemented in a digital system such as digital system 116 to execute OS code 106, application programs, as well as processor allocation software, which may be part of the OS code. A level 1 instruction cache 210 receives instructions from memory 216 external to the processor, such as level 2 cache. Thus, for example, processor allocation software may be stored in memory as an application program or as part of the OS code. Also, code executed by processor 200 may be code stored in its respective execution queue, 107 or 109. Groups of sequential instructions can be transferred from an execution queue 107, 109 to the L2 cache, and subgroups of these instructions can be transferred to the L1 cache.

An instruction fetcher 212 maintains a program counter and fetches processing allocation instructions from L1 instruction cache 210. The program counter of instruction fetcher 212 comprises an address of a next instruction to be executed. Instruction fetcher 212 also performs pre-fetch operations. Thus, instruction fetcher 212 communicates with a memory controller 214 to initiate a transfer of instructions from a memory 216 to instruction cache 210. The place in the cache to where an instruction is transferred from system memory 216 is determined by an index obtained from the system memory address.

Figure 2A:
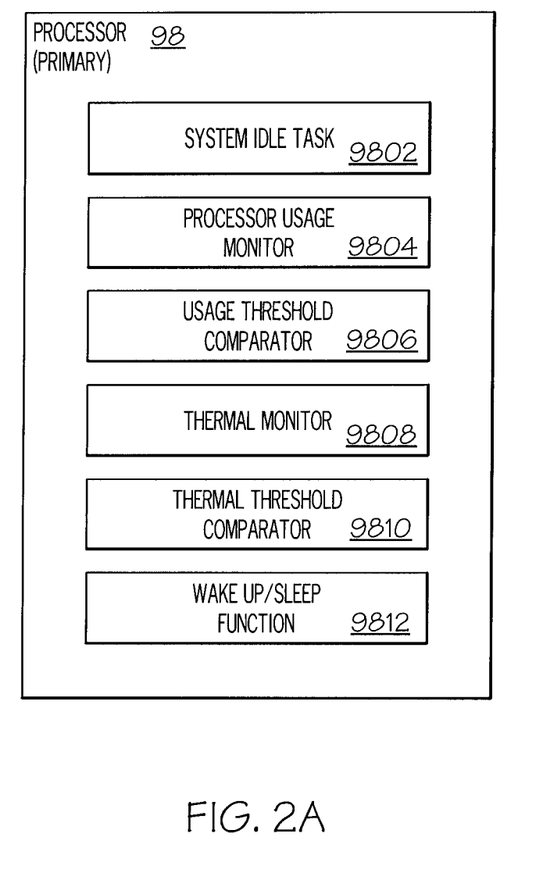
FIG. 2A depicts a block diagram of functions performed by a primary processor for detecting a special condition for allocating processor functions to a secondary processor.

Sequences of instructions are transferred from system memory 216 to instruction cache 210 to implement processor allocation functions. For example, a sequence of instructions may instruct processor 1 to monitor processor usage levels over time. The sequence of instructions may comprise determining if processor usage exceeds a specified threshold. The sequence of instructions may further comprise offloading processing functions to the secondary processor. The sequence of instructions may further comprise detecting a special condition for which processing is offloaded to the secondary processor. For example, certain labor-intensive instructions, such as, for example, floating point instructions, may be offloaded for execution by the secondary processor. These sequences of instructions may be part of operating system code 106 or may be part of a separate program executed by primary processor 98. The functions performed by these sequences of instructions are depicted in FIG. 2A.

Instruction fetcher retrieves instructions passed to instruction cache 210 and passes them to an instruction decoder 220. Instruction decoder 220 receives and decodes the instructions fetched by instruction fetcher 212. Instruction buffer 230 receives the decoded instructions from instruction decoder 220. Instruction buffer 230 comprises memory locations for a plurality of instructions. Instruction buffer 230 may reorder the order of execution of instructions received from instruction decoder 220. Instruction buffer 230 therefore comprises an instruction queue to provide an order in which instructions are sent to a dispatch unit 240.

Dispatch unit 240 dispatches instructions received from instruction buffer 230 to execution units 250. In a superscalar architecture, execution units 250 may comprise load/store units, integer Arithmetic/Logic Units, floating point Arithmetic/Logic Units, and Graphical Logic Units, all operating in parallel. Dispatch unit 240 therefore dispatches instructions to some or all of the executions units to execute the instructions simultaneously. Execution units 250 comprise stages to perform steps in the execution of instructions received from dispatch unit 240. Data processed by execution units 250 are storable in and accessible from integer register files and floating point register files not shown. Thus, instructions are executed sequentially and in parallel.

FIG. 2 shows a first execution unit (XU1) 270 and a second execution unit (XU2) 280 of a processor with a plurality of execution units. Each stage of each of execution units 250 is capable of performing a step in the execution of a different instruction. In each cycle of operation of processor 200, execution of an instruction progresses to the next stage through the processor pipeline within execution units 250. Those skilled in the art will recognize that the stages of a processor "pipeline" may include other stages and circuitry not shown in FIG. 2. Moreover, by multi-thread processing, multiple processes may run concurrently. Thus, a plurality of instructions may be executed in sequence and in parallel to perform processor allocation functions.

FIG. 2 also shows control circuitry 260 to perform a variety of functions that control the operation of processor 200. For example, an operation controller within control circuitry 260 interprets the OPCode contained in an instruction and directs the appropriate execution unit to perform the indicated operation. Also, control circuitry 260 may comprise a branch redirect unit to redirect instruction fetcher 212 when a branch is determined to have been mispredicted. Control circuitry 260 may further comprise a flush controller to flush instructions younger than a mispredicted branch instruction. When secondary processor 100 is asleep, the various components discussed with reference to FIG. 2 are idle. Thus, when secondary processor 100 is asleep, the instruction fetcher, instruction decoder, dispatch unit and execution units are not performing their normal functions but are, instead, idle.

FIG. 2A shows a block diagram of functions performed by primary processor 98 for detecting a special condition for allocating processor functions to secondary processor 100. The functions comprise a system idle task 9802 performed when processor 98 is idle. A processor usage monitor 9804 monitors processor usage. In one embodiment, processor usage is determined as a ratio of time spent in the system idle task during a given period to time spent performing processor functions plus system idle task time. Other measures of processor usage may be employed. A usage threshold comparator 9806 compares processor usage to a threshold to determine if there is a need to allocate processor functions to the secondary processor.

Processor 98 also performs a thermal monitoring function 9808 to determine a system temperature, which may be, for example, the temperature in proximity to the secondary processor. A thermal threshold comparator 9810 compares the measured temperature to a threshold value to determine if the secondary processor should be put to sleep. The temperature is measured by one or more temperature sensors strategically located within the computer housing. In particular, temperature sensors may be located in proximity to the processors. A wake up/sleep function 9812 provides the commands necessary to wake up or put to sleep the secondary processor in the event that a special condition is detected. The instructions for performing the functions of FIG. 2A may be part of the operating system or may be provided as a separate program stored in system memory.

Figure 3:
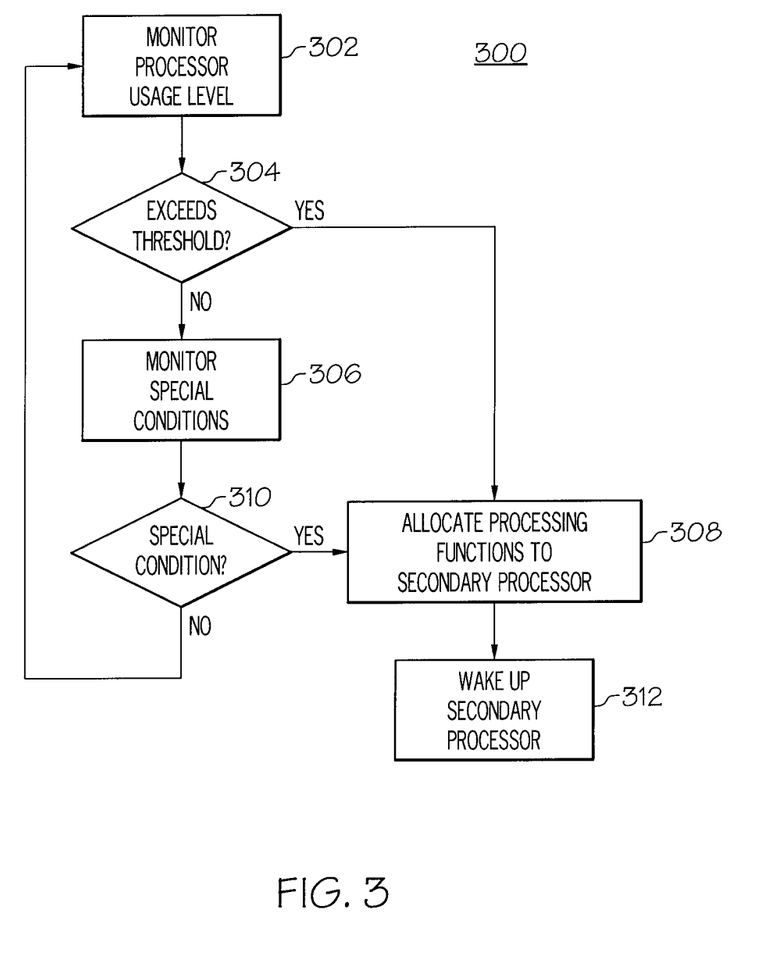
FIG. 3 depicts a flowchart of an embodiment for allocating processing functions between a primary processor and a secondary processor when the secondary processor is asleep and not performing processing functions.

FIG. 3 shows an embodiment of a flow chart 300 for allocation of processing functions when the secondary processor is asleep and not performing processing functions. During normal operation, wherein the primary processor performs all system processing operations, the primary processor monitors processor usage levels (element 302). This may be done by way of the system idle task of the operating system. The primary processor determines if the primary processor usage level exceeds a specified threshold (element 304). If the specified threshold is exceeded, then processing functions are allocated to the secondary processor (element 308) and the secondary processor is awakened (element 312). Processing functions are allocated to the secondary processor by the primary processor moving tasks from its own execution queue to the execution queue of the secondary processor. An attribute of a task's task control block is set to designate the primary processor as the originating processor. Also the task control block indicates if this is a task to be performed by the secondary processor only. Such tasks will always be moved to the secondary processor's execution queue when it is time to awaken the secondary processor.

If the threshold is not exceeded, then the primary processor proceeds in its functions and monitors whether a special condition arises (element 306). Thus, for example, the primary processor may detect if a floating point operation is called for by the instructions in the primary processor's pipeline. In some embodiments, floating point instructions may be offloaded to the secondary processor. In other embodiments, a special condition may be deemed to exist in the event of instructions for performing other labor intensive tasks, such as: spreadsheet calculations and updates, print and preview functions that format and render graphics, application program startups, anti-virus file scans, and viewing web casts. If a special condition exists (element 310), then processing functions are allocated to the secondary processor (element 308) and the secondary processor is awakened (element 312). If a special condition is not detected the process continues at element 302.

Figure 4:
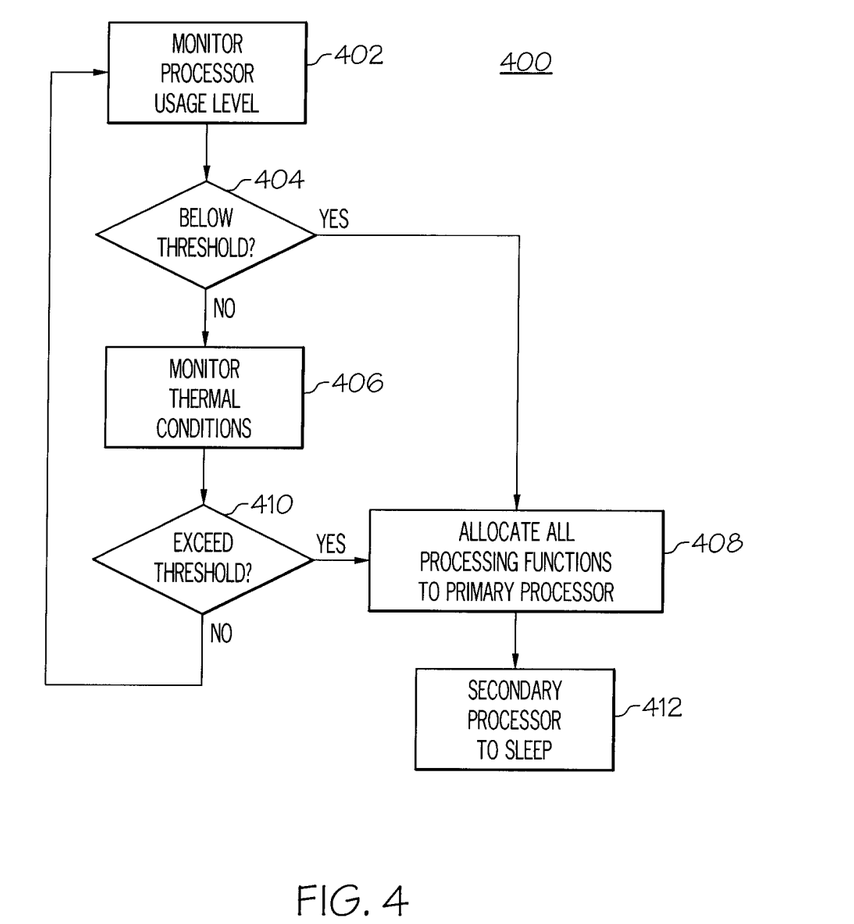
FIG. 4 depicts a flowchart of an embodiment for allocating processing functions when the secondary processor is awake and performing processing functions

FIG. 4 shows an embodiment of a flow chart 400 for allocating processing functions when the secondary processor is awake and performing processing functions. During operation, the operating system may cause the secondary processor to execute a system idle task to monitor secondary processor usage (element 402). In one embodiment, the secondary processor determines if the secondary processor usage level drops below a specified threshold (element 404). In another embodiment, the primary processor determines if usage of the primary processor drops below a threshold. If so, then all processing functions except those to be performed exclusively by the secondary processor are allocated to the primary processor (element 408) and the secondary processor is put to sleep (element 412). If the threshold is exceeded, then the secondary processor proceeds in its functions while the primary processor monitors thermal conditions (element 406).

If a temperature threshold is exceeded (element 410), then all processing functions are allocated to the primary processor (element 408) the secondary processor is put to sleep (element 412). The temperature at issue may be a temperature measured by a temperature sensor in proximity to the secondary processor or a temperature sensor located at some other strategic point in the computer housing. Otherwise, the process continues at element 402. The processing functions are allocated to the primary processor by moving tasks from the secondary processor's execution queue to the primary processor's execution queue. Some of these tasks will be marked as being owned by and performed exclusively by the secondary processor. Such tasks will not be executed by the primary processor, but rather, will be reserved for the secondary processor when it is again awakened by the occurrence of a special condition.

The invention can take the form of an entirely hardware embodiment, an entirely software embodiment or an embodiment containing both hardware and software elements. In one embodiment, the invention is implemented in software, which includes but is not limited to firmware, resident software, microcode, etc. Furthermore, embodiments can take the form of a computer program product accessible from a machine accessible readable medium providing program code for use by or in connection with a computer such as shown in FIG. 1, or any instruction execution system. For the purposes of this description, a machine accessible or computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a machine accessible medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus, such as shown in FIG. 1. The memory elements can include local memory 108 employed during actual execution of the program code, bulk storage, and cache memories 102, 190, which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Thus, another embodiment of the invention provides a computer program product containing instructions effective, when executing in a data processing system, to cause the system to perform a series of operations for allocating processing functions between a primary processor and a secondary processor. The series of operations generally include monitoring one or more special conditions. The secondary processor is maintained in a sleep state if one or more special conditions do not occur. The secondary processor is placed in a wake state and processing functions are allocated to be performed by the secondary processor if one or more processing conditions do occur. The series of operations also comprise monitoring a temperature level and placing the secondary processor in the sleep state if a temperature exceeds a threshold. The series of operations may also include monitoring a usage level of the secondary processor when the secondary processor is not in a sleep state. The secondary processor is returned to a sleep state if the usage level of the secondary processor drops below a threshold. The series of operations may also comprise monitoring a usage level of the primary processor. When the usage level exceeds a threshold, the secondary processor is awakened from a sleep state to perform processing functions.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A multi-processor system to allocate processing functions of a common operating system between a primary processor and a secondary processor, comprising:
    a primary processor to execute the common operating system to perform processor functions exclusive of a secondary processor, the processing functions comprising application code execution, during non-detection of a special condition, and to place the secondary processor in a wake state in the event of detection of the special condition; and
    a secondary processor to execute the common operating system to perform at least some processor functions when a special condition is detected and the secondary processor is in the wake state, and the secondary processor to remain in a sleep state in which a cache of the secondary processor is maintained during non-detection of the special condition, and the secondary processor when in the wake state to be placed in the sleep state if a monitored temperature exceeds a threshold.

2. The system of claim 1, wherein the primary processor configures the secondary processor.

3. The system of claim 1, wherein the secondary executes application program code when not in the sleep state.

4. The system of claim 1, wherein the primary processor executes a system idle task during non-detection of the special condition and wherein the secondary processor executes the system idle task when the secondary processor is in the wake state.

5. The system of claim 1, wherein the special condition occurs if usage of the primary processor exceeds a threshold.

6. The system of claim 1, wherein the special condition occurs if a floating point instruction is received for execution by the primary processor.

7. The system of claim 1, wherein, after the special condition has occurred, the secondary processor returns to the sleep state if the primary processor usage falls below a threshold.

8. The system of claim 1, wherein, after the special condition has occurred, the secondary processor returns to the sleep state if thermal conditions exceed a threshold.

9. A method for allocating processing functions from a common operating system among a primary processor and a secondary processor; comprising:
    storing executable code from the common operating system in a memory accessible by both the primary processor and the secondary processor;
    executing, by the primary processor, the executable code comprising application code during non-detection of a special condition; and
    executing, by the secondary processor, the executable code in response to occurrence of the special condition, the secondary processor to remain in a sleep state in which a cache of the secondary processor is maintained during non-occurrence of the special condition, the secondary processor to be placed in a wake state in the event of occurrence of the special condition, and the secondary processor to be returned to the sleep state if a temperature exceeds a threshold.

10. The method of claim 9, wherein the special condition comprises a processor usage level exceeding a threshold.

11. The method of claim 9, wherein the special condition comprises receipt by the primary processor of a floating point instruction.

12. The method of claim 9, wherein the temperature is monitored by the primary processor.

13. A computer program product comprising a computer useable storage medium having a computer readable program, wherein the computer readable program when executed on a computer causes the computer to:
    monitor one or more processing conditions while a primary processor performs processing functions of a common operating system for the primary processor and a secondary processor;
    maintain the secondary processor in a sleep state in which a cache of the secondary processor is maintained during non-detection of a special condition;
    place the secondary processor in a wake state and allocate processing functions by the common operating system to the secondary processor if the special condition is detected; and
    return the secondary processor to the sleep state if a temperature exceeds a threshold.

14. The computer program product of claim 13, wherein the computer readable program further causes the computer to monitor a usage level of the secondary processor when the secondary processor is a wake state.

15. The computer program product of claim 14, wherein the computer readable program further causes the computer to return the secondary processor to the sleep state if the usage level of the primary processor drops below a threshold.

16. The computer program product of claim 13, wherein the temperature is a temperature in close proximity to the secondary processor.

17. The computer program product of claim 13, wherein monitoring a special condition comprises monitoring a usage level of the primary processor.

18. The computer program product of claim 13, wherein monitoring a special condition comprises detecting a floating point instruction passed to the primary processor.

19. The computer program product of claim 13, wherein the temperature is monitored by the secondary processor.

* * * * *